(12) United States Patent
Megannon et al.

(10) Patent No.: US 11,429,928 B2
(45) Date of Patent: Aug. 30, 2022

(54) SYSTEM AND A METHOD FOR DEPLETABLE, NATURAL ASSET MANAGEMENT, ACCOUNTING AND ANALYSIS

(71) Applicant: MINE RP HOLDINGS (PTY) LIMITED, Centurion (ZA)

(72) Inventors: John Francis Megannon, Pretoria (ZA); Andries George Hendrik Loubser, Randburg (ZA); Michael Woodhall, Blairgowrie (ZA); Edmund Johan Strydom, Pretoria (ZA); Alastair Stuart MacFarlane, Linden (ZA)

(73) Assignee: MINERP IP INCORPORATED, Toronto (CA)

( * ) Notice: Subject to any disclaimer, the term of this patent is extended or adjusted under 35 U.S.C. 154(b) by 183 days.

(21) Appl. No.: 16/682,331

(22) Filed: Nov. 13, 2019

(65) Prior Publication Data
US 2020/0082329 A1  Mar. 12, 2020

Related U.S. Application Data

(63) Continuation of application No. 15/004,743, filed on Jan. 22, 2016, now Pat. No. 10,521,763, which is a continuation-in-part of application No. PCT/ZA2014/000036, filed on Jul. 21, 2014.

(51) Int. Cl.
| | | |
|---|---|---|
| *G06Q 10/00* | (2012.01) | |
| *G06Q 10/08* | (2012.01) | |
| *G06F 16/22* | (2019.01) | |
| *G06Q 50/02* | (2012.01) | |

(52) U.S. Cl.
CPC .......... *G06Q 10/087* (2013.01); *G06F 16/22* (2019.01); *G06Q 50/02* (2013.01)

(58) Field of Classification Search
CPC ............................ G06Q 10/087; G06F 16/22
USPC ......................................................... 705/28
See application file for complete search history.

(56) References Cited

U.S. PATENT DOCUMENTS

| | | | |
|---|---|---|---|
| 8,321,438 B1 * | 11/2012 | Smith ................... | G06F 16/256 |
| | | | 717/136 |
| 2003/0139983 A1 * | 7/2003 | Spencer ............. | G06Q 50/2057 |
| | | | 705/28 |

* cited by examiner

*Primary Examiner* — Rokib Masud
(74) *Attorney, Agent, or Firm* — Fay Sharpe LLP

(57) ABSTRACT

This invention relates to a natural resource and reserve management system, a corresponding method and a resultant natural asset inventory. The system has means for amalgamating and integrating data from disparate expert technical systems and applications, including computer developed or generated data, into at least one common, spatially-referenced database for use by at least one commercially available inventory management application, in order to provide integrated natural asset management in a natural resource inventory. The natural resources and reserves may comprise of depletable mineral resources and reserves, the amalgamation and integration may be conducted continually, and the data may be from disparate expert technical systems and applications in order to provide integrated mineral asset management in a mineral resource inventory.

7 Claims, 12 Drawing Sheets

Figure 1:
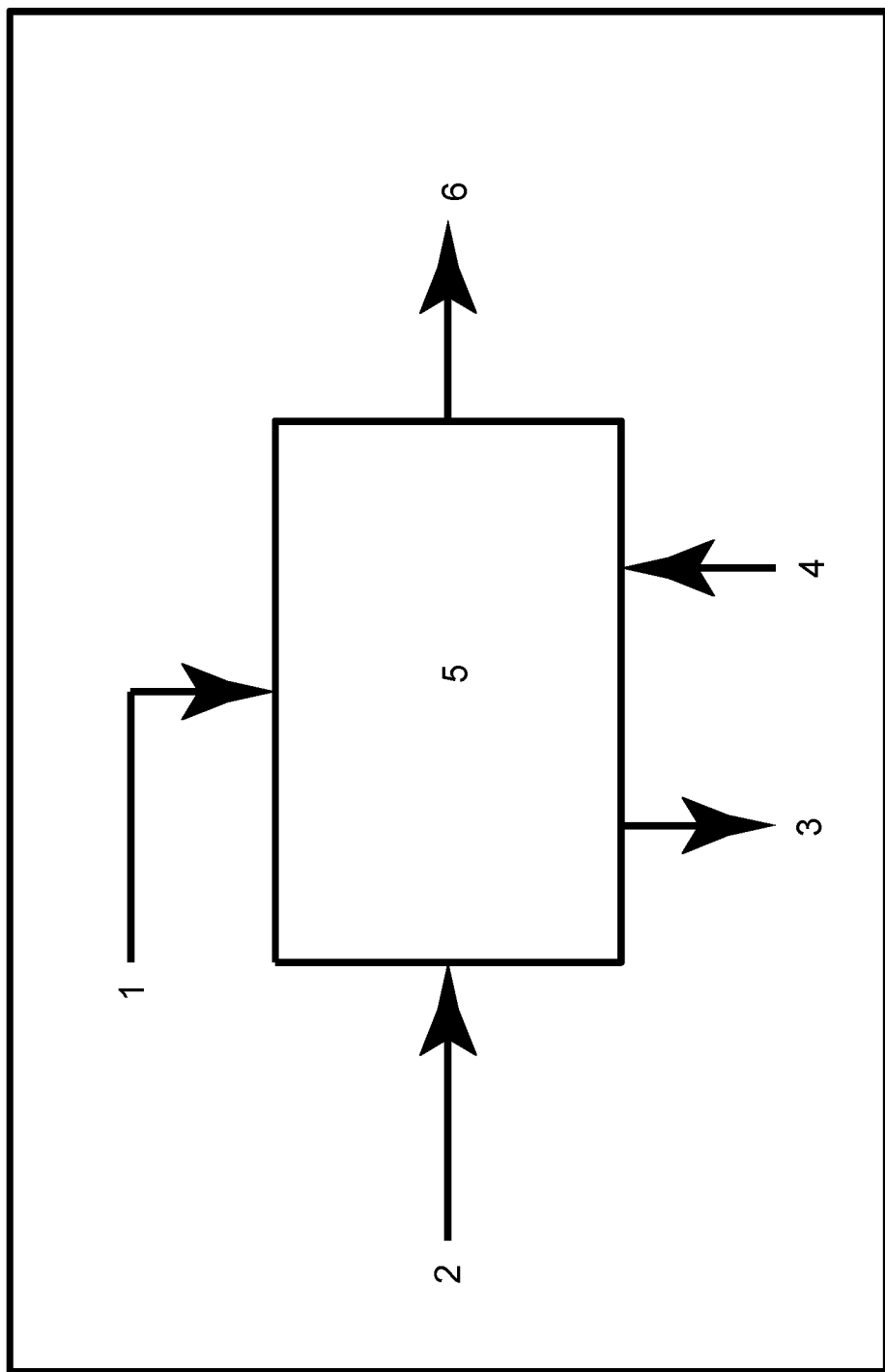

| | Discover | Establish | Exploit | Beneficiate | Sell | Rehabilitate |
|---|---|---|---|---|---|---|
| Mining Technical Disciplines | | | | | | |
| Geology | X | | | | | |
| Survey | X | X | X | X | X | X |
| Planning (dept. discipline rather than mine design) | X | X | X | X | X | X |
| Rock Engineering | X | X | X | | | |
| Mine Environmental | X | X | X | X | | |
| Mine Design & Schedule | X | | | | | |
| Mining | X | X | X | | | X |
| Engineering | X | X | X | | | X |
| Metallurgy | | | | X | | |
| Sales & Marketing | X | | | | X | |
| Rehabilitation (green environmental) | | X | X | X | | X |
| Support Disciplines | | | | | | |
| Enterprise Strategy | X | X | X | X | X | X |
| Financial Management | X | X | X | X | X | X |
| Asset Management | X | X | X | X | X | X |
| Human Resources | X | X | X | X | X | X |
| Safety, Health, & Environment | X | X | X | X | X | X |
| Risk Management | X | X | X | X | X | X |
| Information Technology | X | X | X | X | X | X |
| Corporate Affairs | X | X | X | X | X | X |
| Logistics | X | X | X | X | X | X |
| Material Management | X | X | X | X | X | X |

FIG. 4

| | Accrual | Depletion | Shrinkage | Ullage |
|---|---|---|---|---|
| Mining Technical Disciplines | | | | |
| Geology | New information adds to resource base | | New Structural information reduces size of ore body | Post mining detection of ore left behind |
| Survey | | Measured survey void in ore body | | Post mining detection of excessive waste as ore |
| Planning (dept. discipline rather than mine design) | Updated plan adds to potential ore mined volume | | Updated plan removes from potential ore mined volume | |
| Rock Engineering | Improved support mechanisms permit more mining | | | Deteriorating ground conditions end mining prematurely |
| Mine Environmental | Improved working conditions means better quality mining | | | Deteriorating ventilation conditions end mining prematurely |
| Mine Design & Schedule | Updated plans adds to potential ore mined volume | | Updated plan removes from ore mined volume | Reducing stope width to reduce hoisted stope tons, leaving reef in foot |
| Mining | Mining in a prohibited area (reverse ullage) | | | Mining activity leaves some ore behind |
| Engineering | | | | Inadequate utility support sterilizes ore body |
| Metallurgy | Increased recovery percentage or learn to treat previously untreatable ore | | Conveyor belt spillage | Unrecovered mineral content |
| Sales & Marketing | Finding a new market for previously unsellable product | Selling product | Bullion theft | Deterioration of product due to environmental factors |
| Rehabilitation (green environmental) | Old spillage recovered during plant demolition (recovered ullage) | Revocation of mining license due to environmental impact | | Mining limited for water catchment protection |
| Support Disciplines | | | | |
| Enterprise Strategy | | Reducing resources at a portfolio level | | Change in mine design rules for safety reasons |
| Financial Management | | Increased operating margins and reduced life of mine | | |
| Asset Management | | | Theft of product | Crusher produces too many fines |
| Human Resources | | | Theft of product | Inadequate training and poor mining practice |
| Safety, Health, & Environment | | | Safety officer stops mining as conditions deteriorate with no potential for future recovery | Safety officer stops mining as conditions deteriorate with potential for future recovery |
| Risk Management | Reversal of ullage | | Increased pillar support at the mine design stage with no potential for future recovery | Increased pillar support at the mine design stage with potential for future recovery |
| Information Technology | Confidence improvement as a loss preventative | Confidence improvements as a loss preventative | Confidence improvements as a loss preventative | Confidence improvement as a loss preventative |
| Corporate Affairs | Acquire additional rights | Lose mining rights | | Socially instigated mining loss |
| Logistics | | | | Concentrate loss due to inadequate load covers |
| Material Management | | | | Poor quality rail sleepers cause tramming accidents |

FIG. 5

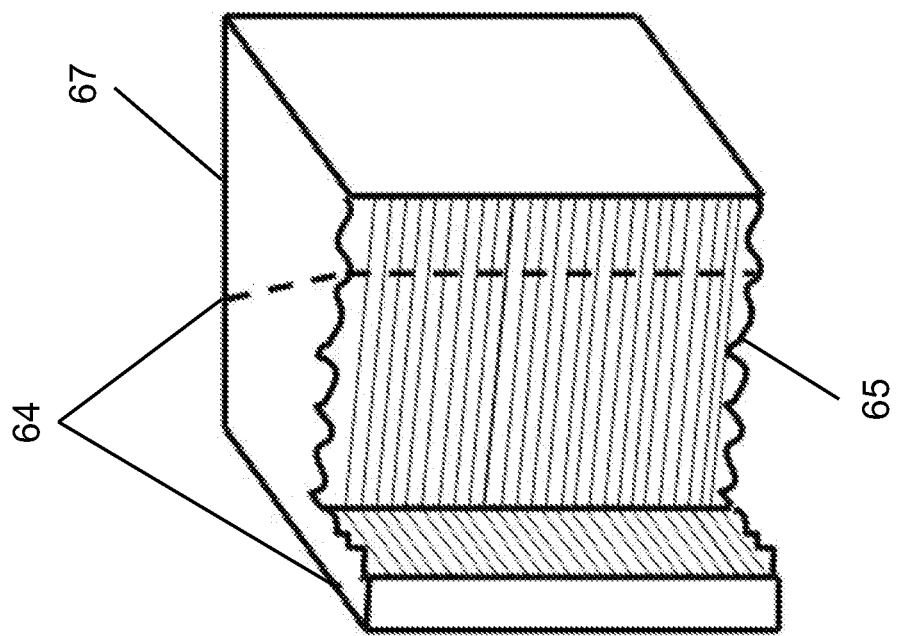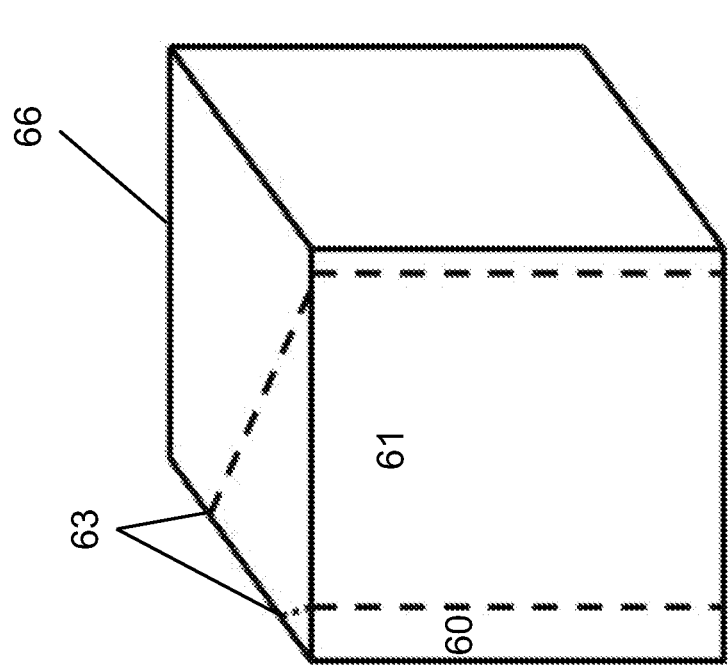
FIG. 9

SYSTEM AND A METHOD FOR DEPLETABLE, NATURAL ASSET MANAGEMENT, ACCOUNTING AND ANALYSIS

This application is a continuation of U.S. patent application Ser. No. 15/004,743, filed Jan. 22, 2016 and titled A SYSTEM AND METHOD FOR DEPLETABLE, NATURAL ASSET MANAGEMENT, ACCOUNTING AND ANALYSIS, which is a continuation-in-part of International Application No. PCT/ZA2014/000036 filed Jul. 21, 2014 which claims the benefit of South African Application No. 2013/05515 filed Jul. 22, 2013, all of which are incorporated herein by reference in their entireties.

FIELD OF THE INVENTION

The invention relates to a system and a method for translating non-renewable, natural resources and reserves, such as mineral deposits, and biological natural resources and reserves that are depletable through unsustainable harvesting or biological reproduction, into inventory and stock items that are manageable within an inventory management system, and generating inventory management system transactions based on physical state and/or logical status changes of the resources and reserves and the corresponding assets.

BACKGROUND TO THE INVENTION

Proper management and exploitation of non-renewable natural resources and reserves and of biological natural resources and reserves that are depletable through unsustainable harvesting or biological reproduction, require proper assessment of the state and/or status of such resources and reserves. For purposes of this specification, the term "depletable" shall be used to refer to natural resources and reserves that are either inherently non-renewable or are depletable through unsustainable harvesting or biological reproduction, and the term "reserve" shall be used to refer to the portion of a resource that is technologically or economically feasible to exploit and shall be deemed to include a so-called "recoverable reserve" or "proved reserve"

Correspondingly, the term "mineral resource" shall be used to refer to mineral bearing material of economic interest in or on the earth's crust, whereas a "mineral reserve" is the portion of such mineral resource that can be mined economically at present, while the cognate term "oil and gas reserves" would define volumes of gas and oil that can be recovered commercially. Unlike the tangible product inventory of a manufacturing company, many natural resources and reserves are physically located underground or underwater or are spread out over vast or inaccessible territories and can therefore not easily be inspected, assessed or quantified, requiring estimates based on the evaluation of technical data that provides evidence of the amount, volume or concentration of such natural resource or reserve present.

In the mining industry specifically, suitable technical data has its origins in a variety of information toolsets available to and used by disparate, professional mining technical disciplines. Such mining technical disciplines are typically classified under so-called Geosciences, Survey, Planning, Rock Engineering, Mine Environmental, Mine Design & Schedule, Mining, Engineering, Metallurgy, Sales & Marketing and Rehabilitation (green environmental) Divisions, with supporting divisions such as Enterprise Strategy, Financial Management, Asset Management, Human Resources, Safety, Health & Environment, Risk Management, Information Technology, Corporate Affairs, Logistics and Material Management. The mining technical data from these disciplines likewise could be reported in technical parameters for material based values such as ore tonnages, slurry densities and mineral grades & recoveries, operational based values such as power consumptions, geological based values such as interpretation of major geological faults & loss factors, and other values such as commodity prices, mine call factors, geological losses, mining overbreaks and labor efficiencies.

Historically, mining technical data remained unamalgamated and untransformed into a globally standardized format that could render the data substantially more available for further multi-disciplinary visualization and analysis. In the mining industry, specifically, information management with such amalgamation and transformation could provide for enhanced decision making based on an understanding of the financial consequences of mining technical activity or observation resulting in changes to the state and/or status of a mineral deposit and thus to that of the corresponding mineral asset in the hands of its right, title or interest holder.

The modern mining industry has widely adopted enterprise resource planning ("ERP") systems typically for integrating information from a range of internal and external systems across the entire organization, including finance/accounting, supply chain, sales and service, customer relationship management, etc., albeit in models where the use of such ERP systems is largely limited to aspects of the business that exclude the mining technical management of the mineral assets. The ERP systems are primarily limited to financial and transactional management of the business and related resources and the associated supply chain, offering only nominal benefit to the core business of the mining industry in general and, more particularly, its technical disciplines such as Geosciences, Mine Planning, Mining, Mining Engineering and Survey, and their related supporting disciplines respectively.

Unlike ERP systems, mining technical systems based management of mineral assets is typically performed within disparate, expert and usually proprietary mining technical systems, applications and solutions, typically implemented with the assistance of similarly proprietary application software, specifically designed to service the discrete needs of specific mining technical disciplines within mining operations. These systems and software typically provide a single expert discipline perspective of a mineral asset, without integration to and amalgamation of data from other separate mining technical disciplines related to the mineral asset. The non-integrated nature of the mining technical systems and services domain thus leaves significant areas, including mineral asset valuation, open to discrete interpretation by different technical and commercial disciplines, generally represented by a competent or qualified person within each, often disparate mining organization.

The lack of suitable systems and methods as well as the limited software integration internationally between mining technical systems and ERP systems are demonstrations of the technical complexity and disparate nature of the mining technical systems domain and the fact that there are limited processes where the activities from a mining technical perspective have a clear one-to-one relationship with a financial or commercial transaction.

The fact that modern mining companies only report on mineral resources and reserves once per annum is a further demonstration of the technical complexity and diversity as well as time consuming nature of the data collecting and assessment process, often comprising of manually integrating and interpreting the various technical data bundles from the mining technical disciplines and their supporting divisions that describe the state of mineral assets. Decisions regarding the application of capital to the mineral assets are accordingly impeded by the lack of integration between the financial and mining technical domains, as is the tracking and reporting against capital projects at a granular level.

In this specification, the term "big data" shall be used to refer to a collection of large and/or very complex data or data sets of a magnitude that is not containable in or manageable with relative ease by common, traditional or on-hand data processing platforms, management tools or processing applications.

OBJECT OF THE INVENTION

It is therefore an object of the invention to provide a system and a method for managing natural resources and reserves, particularly mineral assets, as inventory and/or stock within an inventory management system through the amalgamation and translation of mining technical data and related activities into commercial transactions that are managed and executed within such inventory management system and complementing such transactions through the translation of related technical attributes into inventory or stock descriptors for analytical purposes, in order to optimize the management of such mineral resources and reserves and the exploitation of the specific mineral assets.

SUMMARY OF THE INVENTION

According to a first aspect of the invention there is provided a natural resource and reserve management system characterized in having means for amalgamating and integrating data from disparate expert mining technical systems and applications, including computer developed or generated data, into at least one common, spatially-referenced database for use by at least one commercially available inventory management application, in order to provide integrated natural asset management in a natural resource inventory.

The system may be characterized wherein the natural resources and reserves are depletable mineral resources and reserves, the amalgamation and integration are conducted continually, and the data is from disparate expert technical systems and applications in order to provide integrated mineral asset management in a mineral resource inventory.

The system may be characterized in having means for:
  integrating and amalgamating big volumes of multi-disciplinary mining technical information; and
  leveraging the ability to process big volumes of data in an efficient manner;
thereby effectively bridging the divide between the complexity of multi-disciplinary mining technical information and the methodical world of reporting, analysis, simulation and optimization through translating technical interactions and observations in the relevant commercial context.

The system may be characterized in having means for analyzing and translating mining resources and reserves into inventory and stock items that are manageable in an inventory management system and application and are capable of being analyzed and reported on in a combination of existing inventory management applications and business intelligence applications.

The system may be characterized in being capable of processing changes in mining resources and reserves as a result of changes in the source data contained in any of the mining technical systems and applications in real time and updating the mineral resource inventory accordingly.

The system may be characterized in having means for reporting resources and reserves from within the mineral resource inventory in compliance with regulatory codes, as opposed to the current convention of reporting from a collection of typically non-integrated expert mining technical systems and applications.

According to a second aspect of the invention there is provided a natural resource and reserve management system characterized in having means for translating natural resources and reserves into inventory and stock items that are manageable within an inventory management system, leveraging real-time, big data computing capabilities in order to track over time any changes in the logical status or physical state of the resources and reserves at a granular, spatially indexed level and translating such changes into conventional inventory management transactions capable of being processed in an inventory management application as commercial transactions.

The system may be characterized wherein the natural resources and reserves are depletable mineral resources and reserves and wherein the translations are conducted continually, in order to track any changes over time in the logical status or physical state of the mineral resources and reserves at a pre-selected level of granulation and spatial index.

The system may be characterized in having business rules pertaining to the translation that synthesize mine technical and financial controls, regulatory codes and generally accepted best practices to ensure optimal exploitation of a mineral asset, including the application of capital to the mineral asset.

The system may be characterized in having means for amalgamating and translating technical interactions with and observations of the mineral asset by any technical and associated disciplines that effect changes to the logical status or physical state of the mineral asset at any given spatial location into materials management transactions, which are executed against the mineral resource inventory in the form of at least one of the group of inventory-orientated transactions comprising of:
  accrual, mimicking procure or acquire transactions;
  depletion, mimicking inventory or stock issue transactions;
  shrinkage, mimicking theft or removal processing;
  ullage, mimicking write-off of stock due to damage; and
  movement, mimicking relocation of stock.

The system may be characterized in having means for translating at least some of the technical descriptions, annotations, features and properties data contained within the disparate expert proprietary mining technical systems and applications and solutions from which data is extracted, amalgamated and/or translated, to attributes of the inventory or stock within the mineral resource inventory.

The system may be characterized in having means for retaining at least some of the technical descriptions, annotations, features and properties data being configured within the mineral resource inventory system for analytical and descriptive purposes, based on the requirements of the customer organization.

The system may be characterized in having means for using at least some of the technical descriptions, annotations, features and properties data to conduct any one of the actions selected from the group consisting of reporting, analyzing, simulating, optimizing and performing analytics on the inventory or stock items and modeling the impact of interaction and observation by the various technical disciplines on the mineral asset, as performed within business intelligence and analytics platforms.

The system may be characterized in having means for reporting resources and reserves from within the mineral resource inventory in compliance with regulatory codes.

According to a third aspect of the invention there is provided a method for natural resource and reserve management, the method including the steps of:

integrating and amalgamating big volumes of multi-disciplinary technical data from disparate expert technical systems and applications, including computer developed and generated data, into at least one common, spatially-referenced dataset; and integrating the consolidated resultant dataset with at least one commercially available inventory management application;

in order to provide integrated natural asset management in a natural asset resource inventory, effectively bridging the divide between the complexity of multi-disciplinary technical information and the methodical world of accounting and audit practice through translating technical interactions and observations in the relevant commercial context.

The method may be characterized wherein the natural resources and reserves are depletable mineral resources and reserves, the amalgamation and integrations are conducted continually, and the data is from disparate expert mining technical systems and applications in order to provide integrated mineral asset management in a mineral resource inventory.

According to a fourth aspect of the invention there is provided a method for natural resource and reserve management wherein the natural resources and reserves are translated into inventory and stock items that are managed within an inventory management system, the method including the steps of:

tracking over time changes in the logical status or physical state of the resources and reserves at a granular, spatially indexed level, with the use of suitable big data computing capabilities; and translating such changes into conventional inventory management transactions for processing on an inventory management application as commercial transactions.

The method may be characterized wherein the natural resources and reserves are depletable mineral resources and reserves, the changes are tracked continually for purposes of a mineral inventory management system at a pre-selected level of granulation and spatial index.

The method may include the step of synthesizing mine technical and financial controls, regulatory codes and generally accepted best practices by means of a set of business rules for the translations to ensure optimal exploitation of a mineral asset.

The method may include the step of amalgamating and translating technical interactions with and observations of the mineral asset, by technical and associated disciplines that effect changes to the logical status or physical state of the mineral asset at any given spatial location, into materials management transactions, which are executed against the mineral resource inventory in the form of at least one of the inventory-orientated transactions selected from the group consisting of accrual, mimicking procure or acquire transactions; depletion, mimicking inventory or stock issue transactions; shrinkage, mimicking theft or removal processing; ullage, mimicking write-off of stock due to damage; and movement, mimicking relocation of stock.

The method may include the step of translating all technical descriptions, annotations, features and properties data contained within the disparate expert proprietary mining technical systems and applications and solutions, from which data is extracted, amalgamated and/or translated, to attributes of the inventory or stock within the mineral resource inventory.

The method may include the step of configuring at least some of the technical descriptions, annotations, features and properties data to persist within the mineral resource inventory system for analytical and descriptive purposes, based on the requirements of the customer organization.

The method may include at least one of the steps selected from the group consisting of reporting, analyzing, simulating, optimizing and performing analytics on the inventory or stock items and modeling the impact of interaction and observations by the various technical disciplines on the mineral asset, as performed within business intelligence and analytics platforms, with the use of at least some of the technical descriptions, annotations, features and properties data.

The method may include the step of reporting resources and reserves from within the mineral resource inventory in compliance with regulatory codes.

According to a fifth aspect of the invention there is provided a natural asset inventory, comprising of natural resources and reserves, translated into inventory and stock items that are manageable within an inventory management system with the use of big data computing capabilities in order to track over time any changes in the logical status or physical state of the resources and reserves at a granular, spatially indexed level, and wherein the such changes are translated into conventional inventory management transactions capable of being processed in the inventory management application as commercial transactions.

The natural asset inventory may be characterized wherein the natural resources and reserves are depletable mineral resources and reserves and wherein the change is effected by the impact of interaction and observations by the various technical disciplines on mineral assets in order to provide a mineral asset inventory at a pre-selected level of granulation and spatial index.

DETAILED DESCRIPTION OF THE INVENTION

Figure 2:
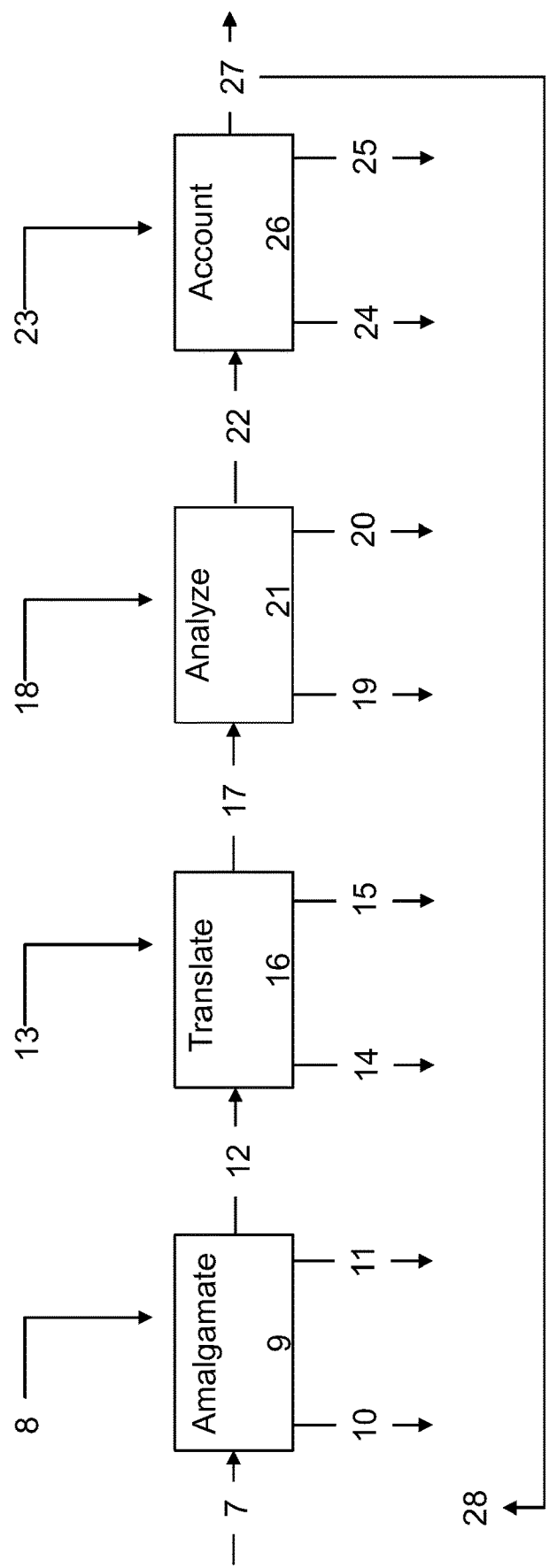
Figure 3:
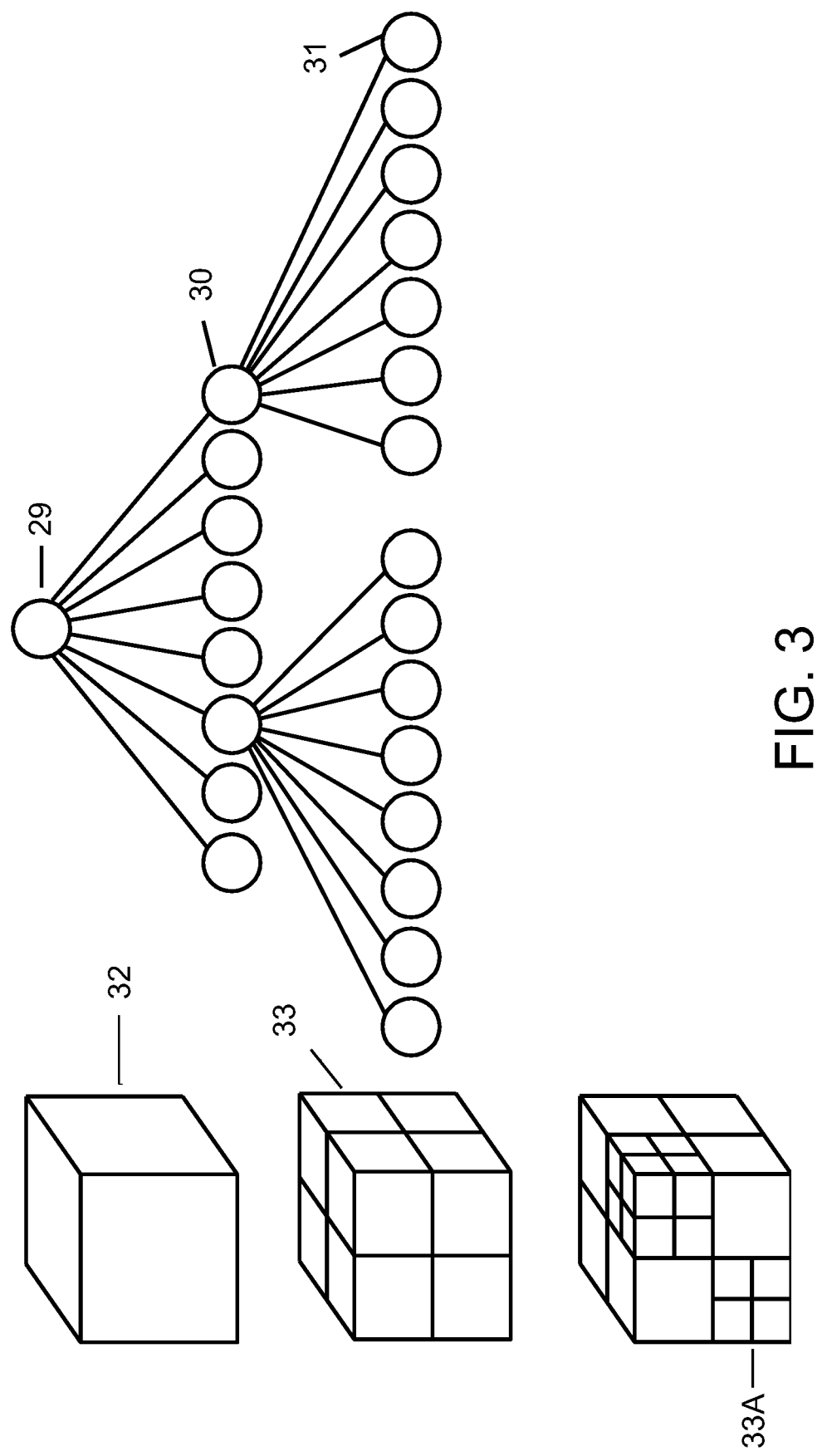
Figure 6:
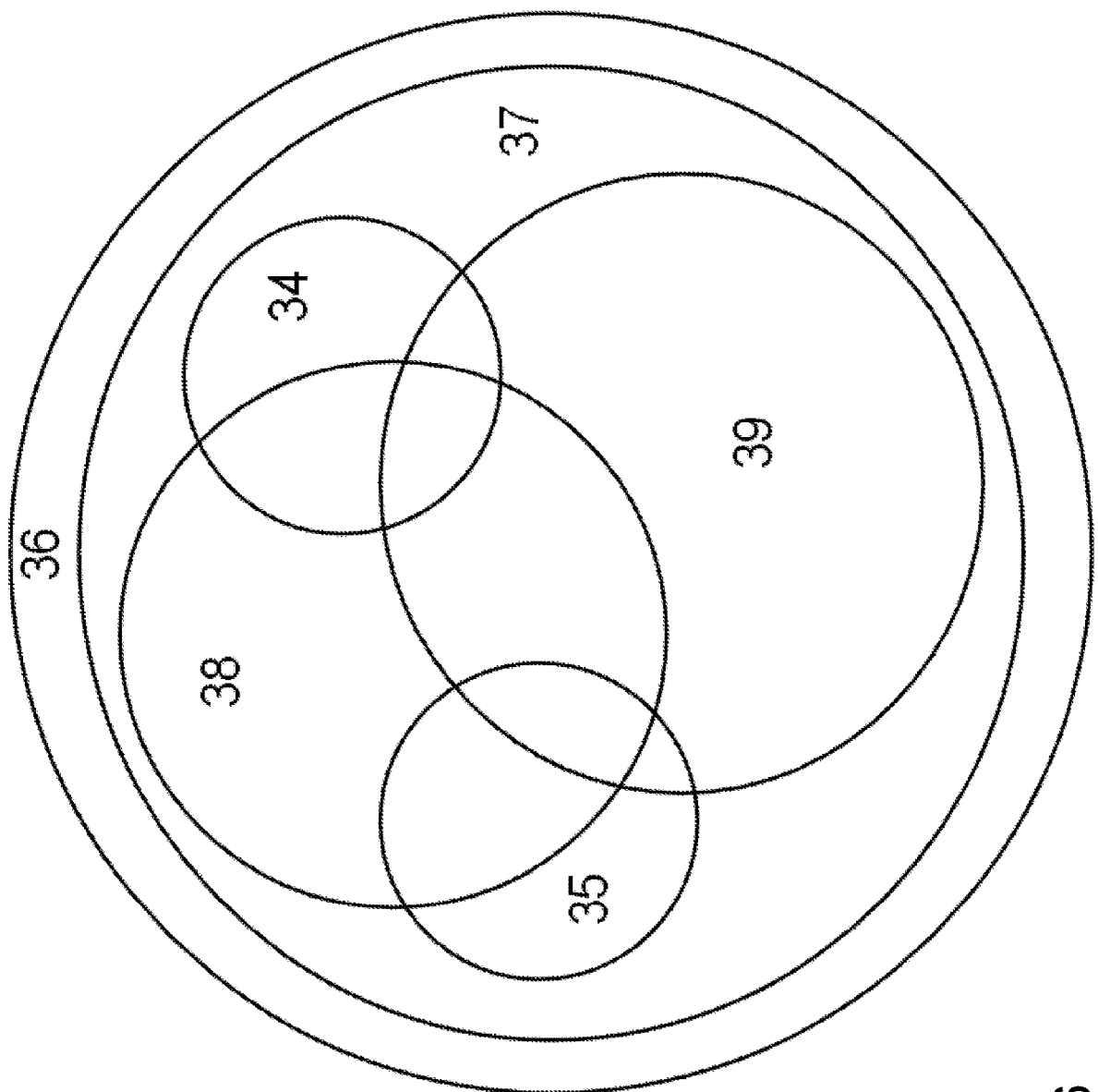
Figure 7:
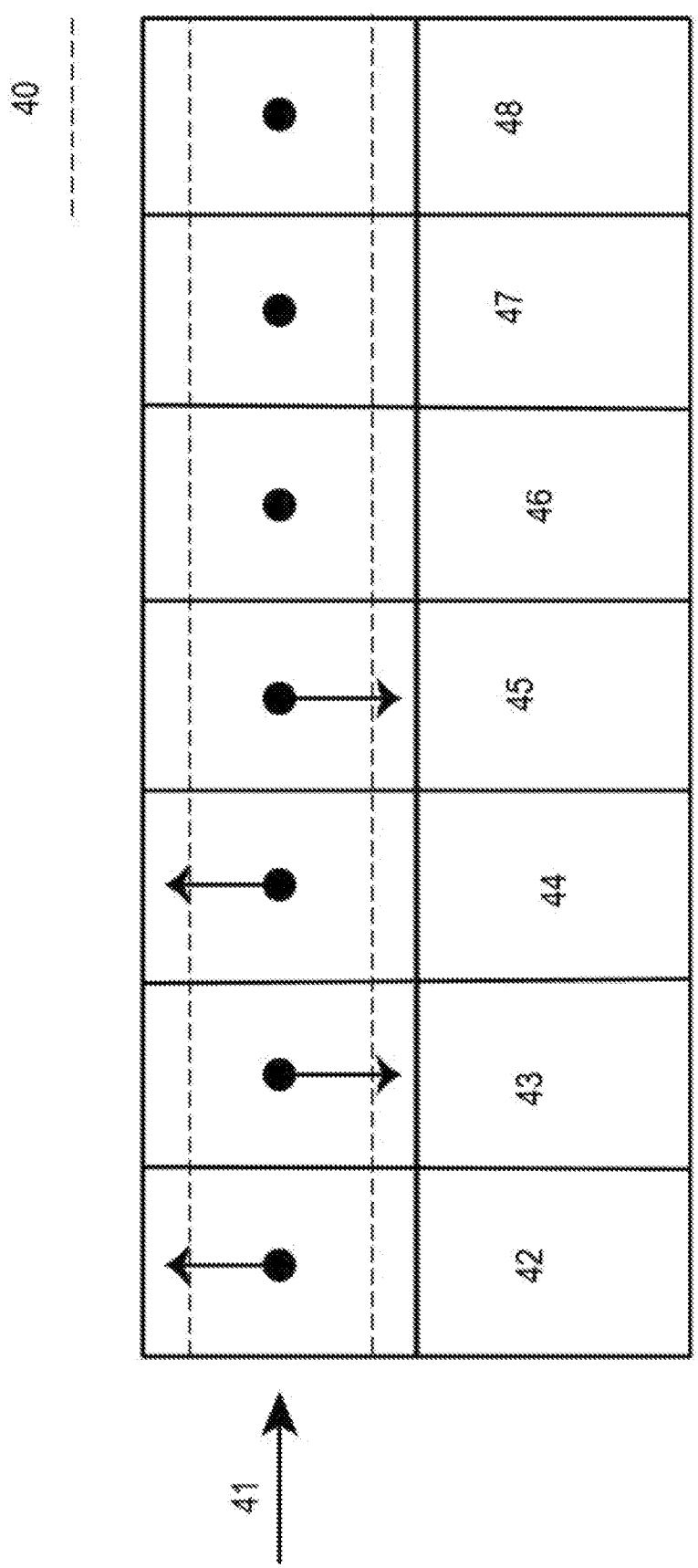
Figure 8:
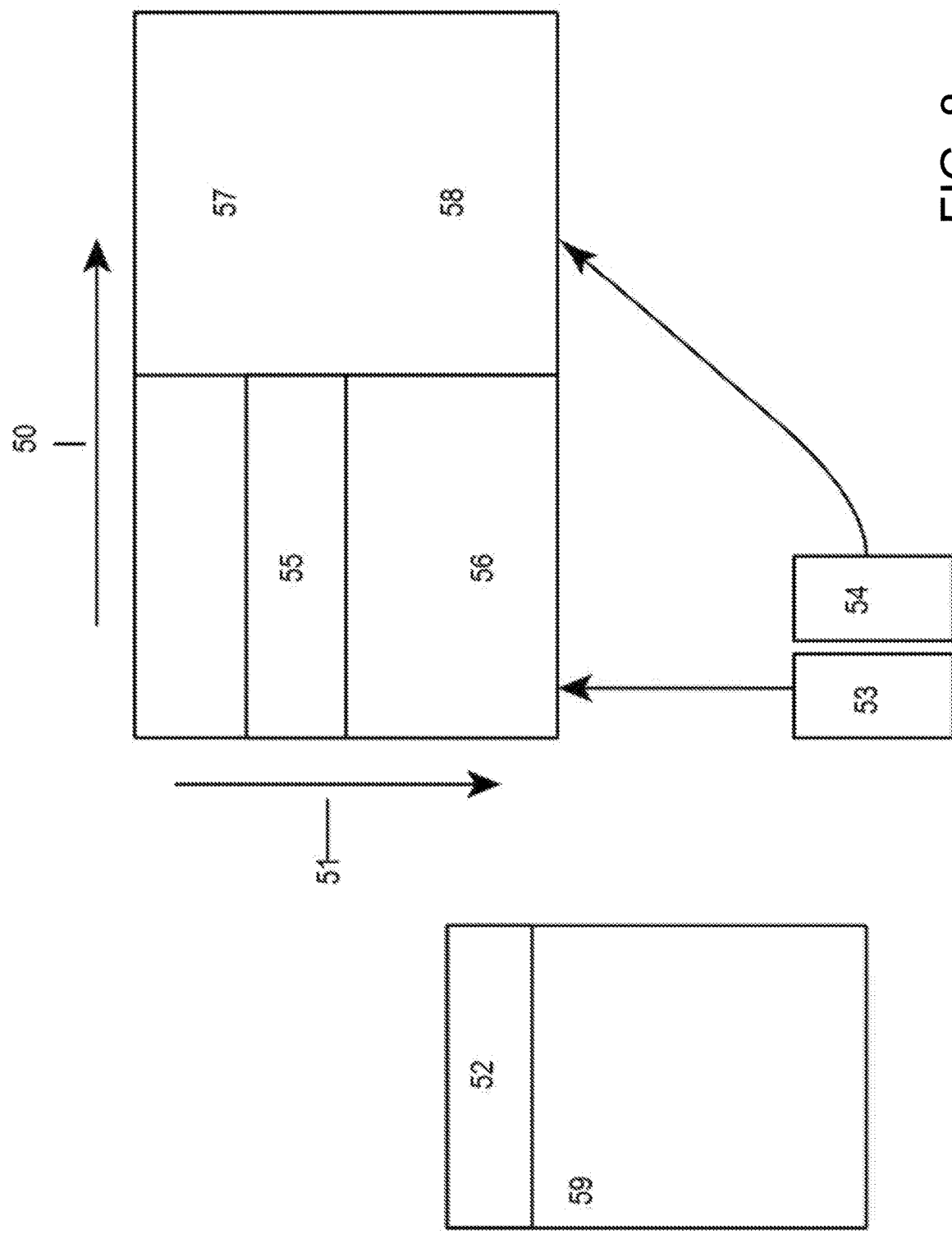
Figure 10:
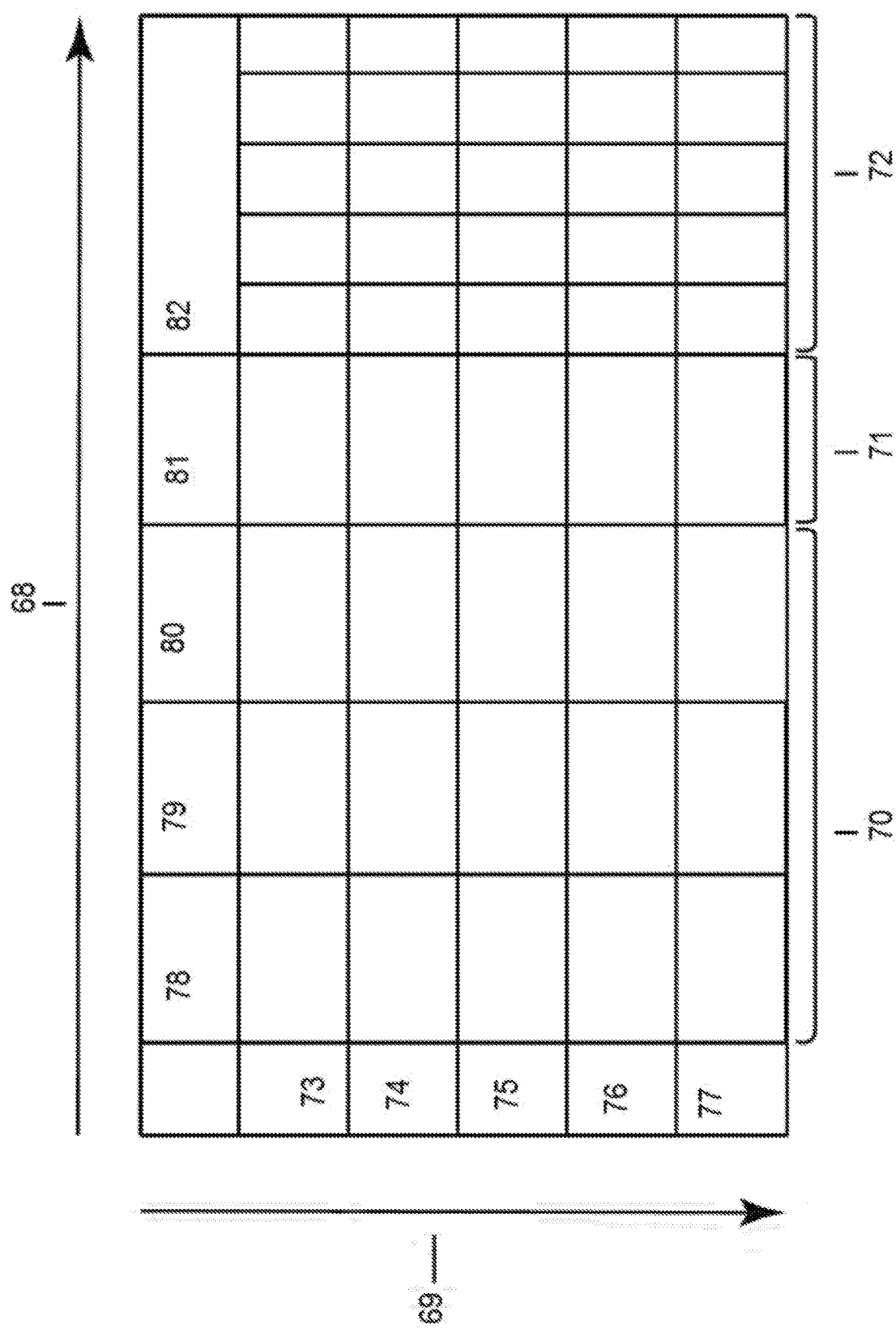

A preferred embodiment of the invention shall now be described with reference to the accompanying Figures wherein:

FIG. 1, reflecting a process map key, is a representation of the IDEF0 modeling tool commonly used to produce a model or structured representation of the functions of a system and of the information and objects which tie those functions together;

FIG. 2, reflecting a proprietary mineral asset inventory management system model of the applicant, is an overview process map describing the sequential flow of mining technical information with value adding methods applied to provide improved business decisions in the context of mineral asset management;

FIG. 3 reflects an industrial example of spatial reporting constant;

FIG. 4 reflects mining technical & support disciplines and their impact across the mining value chain;

FIG. 5 reflects mining technical & support disciplines and their relationship to material management transactions;

FIG. 6 reflects a geo-x effect on resources and reserves;

FIG. 7 reflects a mineral parameter meter;

FIG. 8 reflects a mining features database;

FIG. 9 reflects an amalgamation, translation and transaction cube;

FIG. 10 reflects a mineral inventory or stock storage bin; and

Figure 11:
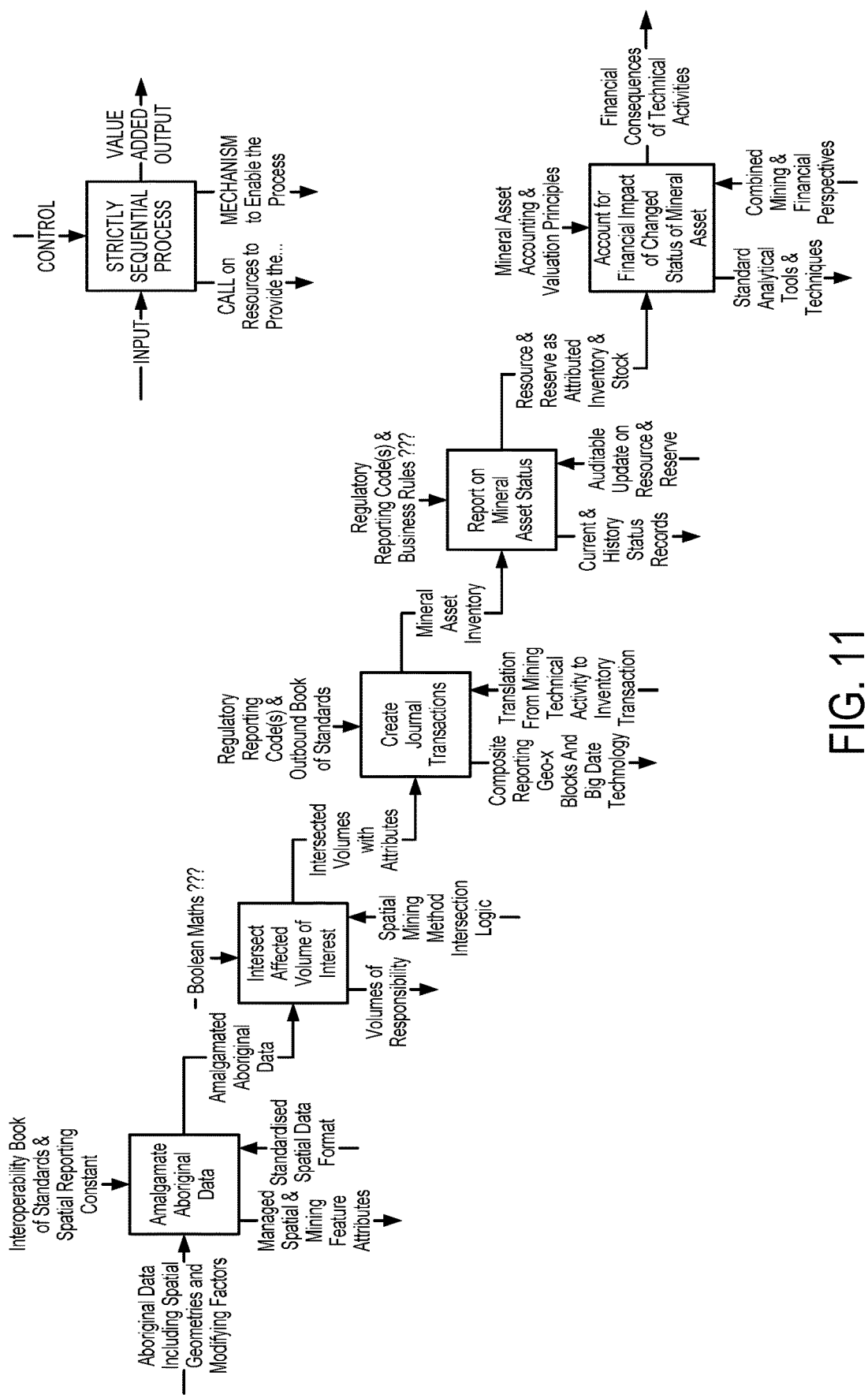

FIG. 11 reflects the geo-financial integration process holistically, in accordance with the invention.

Figure 12:

FIG. 12 reflects a schematic diagram of some of the physical componentry for a system and a method for depletable, natural asset management, accounting and analysis in accordance with the invention, based on the overview process map describing the sequential flow of mining technical information as illustrated in FIG. 2.

DETAILED DESCRIPTION

The invention comprises of a system for and method of managing the mineral asset in a mining organization by means of a so-called mineral resource inventory system, whereby the mineral asset is managed as inventory and/or stock in one or more implementations of a commercially available inventory management application system.

The mineral resource inventory management system and associated process involve the integration of data from disparate expert proprietary mining technical systems and applications and solutions designed to service the discrete needs of specific mining technical disciplines within mining operations and the amalgamation of such data into a single spatially-indexed data structure encapsulating all spatial, design, descriptive and quantification attributes related to the source data, providing a perspective that reflects a multi-disciplinary perspective on any given spatial location.

FIG. 1, reflecting a process map key, shows the conventional IDEF0 modeling tool commonly used to produce a model or structured representation of the functioning of a system and of the information and objects which tie that functioning together. Typically, each sequential process 5 will have inputs 2, and value added outputs 6, constrained by one or more controls 1. Each process is able to call 3 on other mechanisms 4 to enable the process.

FIG. 2, reflecting a proprietary mineral asset inventory management system model according to a preferred embodiment of the invention, describes the sequential flow of mining technical information with value adding methods applied to provide improved business decisions in the context of mineral asset management. The Figure shows the extraction 7 of mining technical discipline spatial geometries and attributes of such geometries that are potential modifying factors to the geology from disparate expert proprietary mining technical systems and applications and solutions. The Figure further shows the deconstruction of the dimension and fact data contained within such disparate expert software applications and solutions, based on a configurable selection 8 of such potential modifying factors, into:

1. one or more spatial databases containing all spatial references, collections of space and shapes related to mining and applies a common spatial reference system to locate all spatial data within a common reference system; and
2. a collection of all technical descriptions, annotations, features and properties data contained within the disparate expert proprietary mining technical systems and applications and solutions from which data are extracted, amalgamated 9 and translated to attributes that describe the collective disciplines' perspective on the mineral asset, contained within a collective amalgamated database.

The amalgamation 9 of mining technical information performs a spatial mining method based intersection 11 of all geometries in line with the configured attribute boundaries specified for the spatial database and mining feature attribute set 10 and introduces a spatial reporting constant 8, overlaid on the amalgamated dataset and able to support a composite geo-x cube 12, which adopts a level of granularity required to encapsulate the necessary level of reporting detail as needed for any specific volume of responsibility.

FIG. 3 illustrates the method implemented in the determination of the required granularity in a contiguous division of space to the level of granularity required to encapsulate an element at the required granular spatial representation, demonstrated in 29 through 33A, using any instance or combination of the platonic shapes.

FIG. 5 contains a list of mining technical and support disciplines and depicts potential inventory journal transactions that may result from technical activities they may perform in their daily operational capacity in accordance with the invention.

FIG. 7 reflects a mineral parameter meter, exposing many important variables required to provide a routine and comprehensive understanding of the interaction between mining methods and ore body. It caters for the routine monitoring of identified resource and reserve modifying factors, tracking the relevant parameters as any changes become known, assessed as to current acceptability and related to historical trends.

FIG. 8 reflects a mining features database, a collection of features contributed by multiple mining technical disciplines such as Geology, Mine Design & Scheduling and Survey each with its properties and attributes, etc. Attributes can infer characteristics such as confidence classification, tonnes, grade, volume of responsibility, period of mining, etc., with relevance defined by the mining company's requirements and reporting codes. Analytical possibilities are opened up due to ability to utilize existing business intelligence tools and methods on inventory and stock.

FIG. 9 addresses the core principles related to the manner in which mineral assets are spatially handled, as the key to the amalgamation 9, translation and creation of transactions to process as inventory journal transaction equivalents of spatial geometry, with a stated level of attributed confidence. As more information becomes available, changes to size and shape are acknowledged, and the amalgamation of new information will result in a series of translations based on intersecting geometries.

The following is a demonstration of the manner in which spatial geometries reflect the current understanding, based on the extent and maturity of information available, as to the constitution of the mineral asset as it relates to the specific geometry:

Portion of mineral asset recognized as waste 60;

Portion of mineral asset recognized as ore 61;

Delineation boundary between defined ore and waste 63;

Planned boundary for mining excavation 64;

Mined out volume 65;

Volume of mineral asset undergoing update based on new information 66; and

Planned mining volume based on updated mineral asset knowledge 67.

FIG. 6 is a schematic representation of the manner in which modifying factors 34 to 39 are introduced by the various individual parties/disciplines who and/or which may have an impact on the overall confidence in terms of classifying the potential to exploit the mineral asset. The system is aware of the permutated cross-discipline impact on the mineral asset, the principle of which is explained above.

The permutated geo-x effect on resources and reserves is the net result of the application of mining technical sciences to the sum of mineral asset knowledge, including consideration of multiple geo-sciences together with consideration of mining, metallurgical, economic, marketing, legal, environmental, social and government factors, deemed as modifying factors which influence the confidence in terms of resource and reserve classifications.

Inter-operability between disparate expert proprietary systems and applications and solutions reverses the deconstruction process by extracting and reconstituting both spatial and attribute data from the amalgamated databases into the file format and structure required by the specific expert proprietary software system or application or solution.

The system interrogates the composite geo-x cube 12 at the lowest level of applied granularity in terms of 29-33A, i.e. per geo-x block, within 55, 56 the bounds and definitions 13 of the relevant regulatory reporting code 56 and extended to include the company information requirements 58 required for further inventory and stock analysis 57, based on books of standards 53 & 54 mapped as the filters to the amalgamated attributes relevant to the mining technical disciplines, persisted 59 in the mining features database 52. The resultant attributes are persisted 59 as inventory or stock descriptive and quantification data.

The system contains a spatial database 10 and mining feature attribute set, which implements a configuration capability as a mineral parameter meter that sets firm perspectives on variables which are acceptable between specific bounds 40, relative to an academic mean 41. This includes parameters such as density 42, interpretation 43 of major faults as geological loss factors, commodity price 44, mine call factor 45, pothole losses 46, mining overbreak 47, labor efficiency 48, etc. This relates to a configurable interpretation of mining factors that becomes a constant through which translation occurs. This allows it to be configurable per ore body, commodity or legal entity such as a company to align classification of inventory and stock in an inventory management application platform to the related resource and reserve reporting codes.

The system derives a classification of inventory or stock through analysis utilizing emergent 14 big data analytics technology at a geo-x block level, interrogating the current state and status of the block, represented by a permutated interpretation of the attributes in the amalgamated database, which describe the features of the geology as mapped to the spatial constant 8, creating a data set from which the detailed requirements for creating an inventory journal transaction can be constructed.

The system creates journal transactions for execution within an inventory management system to place a reference to the specific geo-x block, based on the classification of inventory or stock which is derived, in a storage bin location within the inventory system along with associated attributes defined in 54, 55, 56. This step relates to translating 15 a set of attributes and attribute information into a financial journal transaction 16, passed to the inventory management application for execution as the initial population of the inventory management application. Journal transactions 16 are processed in one of five transaction types 17, and are extensible to more if needed. This process, at take-on, is repeated for each relevant geo-x block within the database.

FIG. 10 illustrates how the mineral inventory or stock storage bin definition is derived, based on the common principles across the various resource and reporting codes. The definitions for the matrix in diagram 10 are:
Axis for increasing confidence of classification within mineral asset 68;
Axis for increasing grade categories within mineral asset 69;
Portion of mineral asset designated as in situ resource inventory 70;
Portion of mineral asset designated as in situ reserve inventory 71;
Portion of mineral asset designated as in progress reserve stock 72;
Increasing grade categories 73 to 77; and
Increasing confidence of classification categories 78 to 82.

Storage bins are defined by considerations of mineral content quality ranges and information confidence levels. While mineral content quality ranges must suit the mining company's purposes such as determining commercial grade cutoffs, information confidence levels relate to resource and reserve classifications as per the relevant reporting code.

Continuous real-time monitoring of the attributes within the amalgamated database, at a level of granularity where a relevant attribute changes within a single geo-x block, initiates a re-intersection of the related/affected blocks and an update to the database through the process of 17 journal processing. Mining technical disciplines that interact with the mineral asset in a manner that may affect attributes that have an influence/impact on the mineral asset are listed in FIG. 4, elaborated in terms of their impact across the mining value chain as depicted in the open group exploration & mining business process reference model.

Based on the processing of journal transactions within the inventory management application, the mineral resource inventory is populated, and one can report 21 on mineral asset status at any level of granularity. Reporting principles are subject to the relevant regulatory reporting code and company analysis requirements 18. Geo-x blocks are stored within inventory/stock storage bin locations in a hierarchy that reflects the resource and reserve code based classifications from lowest confidence 50 to highest, and lowest grade 51 to highest in any combination dependent on the configured reporting code. Reporting takes into consideration current and historical status records 20 and is aware of the latest reporting block updates 19, which have been processed as journal transactions 17. The mineral asset status 21 is updated by calling on each affected reporting block update 19 to provide the current and historical status records 20 with regard to changes in the mineral asset statuses.

Intersecting the spatial reporting constant 8 with the current and historical status records 20 (historical attributes) that had previously effected changes to the mineral asset allows for a time based status (logical, e.g. specific grade) and/or state (physical—e.g. faulting or mined out) analysis of the mineral asset and the ability to interrogate the mineral asset in a time series analysis, which is introduced to geological analyses in this invention. The system overlays the amalgamated geological data over the reporting cube and derives the individual versions of mineral asset change through reference and/or reconciliation to the original reporting cube and subsequent attribute updates through expert mining technical systems and applications. In this manner it handles history and the traceability and auditability through retaining a full transactional record of how and where attributes changed to effect a change in inventory.

Resource and reserve reporting can now be performed on resource and reserves 22 as attributed inventory and stock, up to date to reflect the latest 19 reporting block updates, subject to the attribute configuration relative to the book of standards 8.

The emergence of big data analytics technologies, and the future technologies in this space, enables the ongoing real-time update of the mineral asset inventory as changes are made to the attributes in the various expert mining technical systems and applications and updated to the amalgamated database. The system 26 accounts for the financial impact of changed states and statuses of mineral assets using standard analytical tools and techniques 24, guided in design by mineral asset accounting and valuation principles 23, leading to a clear understanding of the financial consequences 25 of technical activities and allowing the execution of reporting scenarios to enable 27 enhanced business decision making.

The system processes changes to the mineral asset within the mineral asset inventory by iterating through the steps in the system and method, with the exception that the focus is on changed attributes versus a complete re-population of the mineral inventory, thus reiterating 28 the process as and when new activities and information occur.

The completely integrated process of the geo-financial integration is illustrated in FIG. 11, comprising of the sub-processes of (a) amalgamation of the aboriginal data, (b) intersection of the affected volume of interest, (c) creation of journal transactions, (d) reporting on mineral asset status, and (e) accounting for financial impact of changed status of mineral Asset.

In an industry application, as reflected in FIG. 11, the geo-financial integration process is applied holistically, in accordance with the invention, reflecting all the functions from the amalgamation of aboriginal data to accounting for the financial impact of changed state and status of the mineral asset under management. The systems and methods being introduced are unique in the integration that the invention brings about in the mining industry, crossing over mining technical, financial accounting and administration boundaries in a broad integration of known technologies and application domains, to create an objective information source underlying the mineral asset and provide comprehensive auditability and traceability of changes to the state and/or status of the mineral asset in a real-time mode leveraging the emergence of capabilities to service big data volumes with performance increased by orders of magnitude.

FIG. 12 is a schematic diagram of some of the physical componentry incorporated in a computer-implemented system and method for depletable, natural asset management, accounting and analysis in accordance with the invention.

The computer-implemented system includes a non-transitory computer readable storage medium (not shown), storing computer-executable instructions, capable of extracting, amalgamating, translating and integrating big volumes of multi-disciplinary mining technical information/data from the disparate expert technical systems and applications, including computer developed or generated data, into the common, spatially-referenced database for use by the inventory management application to provide integrated mineral asset management in the mineral resource and reserve inventory of the preferred embodiment.

The computer-implemented system effectively bridges the divide between the complexity of multi-disciplinary mining technical information and the methodical world of reporting, analysis, simulation and optimization through translating technical interactions and observations in the relevant commercial context.

The system further includes a non-transitory computer accessible extractor 100 as means for extracting the data. The extractor extracts the aboriginal data, inclusive of its appropriate spatial geometries and mindful of the industry generic and geological and mining environment specific modifying factors as they relate to the regulated definition of resources and reserves for various mineral occurrences.

The system further includes a non-transitory computer accessible amalgamator 101 as means for amalgamating multi-disciplinary mining technical information. The amalgamator 101 transforms the extracted information into a globally standardized format, thereby making the resultant data available for further multi-disciplinary visualization and analysis, enabling accounting for the financial impact of mining technical activity resulting in changes to the state and status of the mineral asset.

The system further includes a non-transitory computer accessible translator 102 as means for translating the amalgamated data, and hence the corresponding natural resources and reserves, into inventory and stock items and transactions manageable within an inventory management system. The translator 102 leverages real-time, big data computing capabilities in order first, to track over time any changes in the source data, as contained in any of the mining technical systems and applications and hence, any change in the logical status or physical state of the related resources and reserves, at a granular, spatially indexed level, and second, to translate such data changes in real time into conventional inventory management transactions capable of being processed in an inventory management application as commercial transactions.

Retaining the available detail associated with multi-disciplinary mining technical activities requires dealing with large mining technical datasets at various levels of granularity. This is accommodated by use of the composite reporting constant in its smallest geometric configuration containing the amalgamated aboriginal data of interest.

The system further includes a non-transitory computer accessible analyzer 103 as means for analyzing at least some of the technical descriptions, annotations, features and properties data being configured within the mineral resource inventory system for analytical and descriptive purposes, based on the requirements of a customer organization.

The analyzer 103 conducts activities such as reporting, analyzing, simulating, optimizing and performing analytics and modeling the impact of interaction and observation by the various technical disciplines on the mineral asset, as performed within business intelligence and analytics platforms.

Timely supply of information for reporting and analytical requirements is accomplished by leveraging the ability to process large volumes of data in an efficient manner, employing current and future big data platforms such as in-memory databases.

The combination of well managed data and efficient processing is fundamental to the successful translation from mining technical activities as described by mining technical professionals to inventory transaction terminology and format as understood by accounting professionals.

Mining technical activity and observations of the mineral asset by any technical and associated disciplines that effect changes to the logical status or physical state of the mineral asset at any given spatial location can therefore be executed against the inventory of mineral resources and reserves as inventory-orientated transactions such as accrual (mimicking procure or acquire transactions), depletion (mimicking stock or inventory issue transactions), shrinkage (mimicking theft or removal processing), ullage (mimicking write-off of stock due to waste or damage, etc.), and move (mimicking simple relocation of stock without further processing).

More particularly, the invention translates mining technical transactions from a wide range of disparate, proprietary expert applications into inventory transactions through integrating data across the total mining technical systems domain and amalgamates such data into a single source; then transacts all mining activities within any commercially available inventory management application in order to manage the mineral asset within the bounds of generally accepted best practices. The invention enables both the commercial management competencies and the mining technical competencies within a mining organization to collaborate in the management of the mineral asset to its maximum value as if within a single, controlled technology domain and chart of accounts. The invention enables commercial modeling and scenario management through the application of standard business intelligence tools and techniques to the amalgamated model.

The invention also instantiates a discrete spatial constant against which mining technical activities are translated to commercially oriented inventory transactions, thereby introducing an advanced level of objectivity into the valuation of mineral assets.

The invention further translates geological and other mining technical activities impacting the mineral asset into conventional inventory transactions, managed in any commercially available inventory management application, thus introducing the ability to include the mineral asset in the chart of accounts of a mining company. History of changes driven by technical activities is managed within the inventory application and enables auditability and traceability and extends to versioning reporting across timelines. The total lifecycle, technical and commercial, can be audited from a single point and platform.

The novelty of the invention thus also resides in the fact that it introduces totally new systems and methods of amalgamating, integrating and processing technical and financial data and methods of interpretation and, accordingly, novel systems and methods of managing natural resources and reserves such as mineral resources and reserves, including mineral assets, particularly from a technical and a financial perspective. The capabilities introduced by this invention are of a sufficient quantum to make a material and invaluable difference in the technical and financial assessment, reporting and valuation of mineral resources and reserves, including mineral assets, and therefore of the corresponding mining companies.

It will however be appreciated that many variations in detail are possible without departing from the scope and/or spirit of the inventions as claimed in the claims hereinafter, such as its implementation both as an application system and as an integration of multiple systems as described hereinabove, and can also be extended to implement as audit and consulting systems and methodologies, thus adding value to the technical aspects of mining and financial auditing, as well as the broader investor community and the management of other depletable natural resources.

What is claimed is:

1. A method for computer-implemented natural resource and reserve management suitable for use with disparate expert technical systems and applications that are unable to integrate the geometries and attributes at any specific spatial location in such natural resource or reserve, to reasonably describe a collective, multi-disciplinary technical perspective of the resource or reserve in relation to a specific spatial location or to allow tracking over time of changes in the logical status or physical state of the resource or reserve at that location, the computer-implemented natural resource and reserve management method including the steps of:
providing:
a non-transitory computer readable storage medium storing computer-executable instructions;
at least one common, integrated, spatially-referenced database, configured to retain spatially indexed, technical geometries and attributes of a specific spatial locations therein; and
a common spatial index, with a specific level of granulation and spatial location, configured to enable integration of the geometries and attributes of the resource or reserve in relation to a specific spatial location, and reasonable description of the collective technical perspective of the resource or reserve in relation to that location;
extracting disparate, technical data, defining technical discipline spatial geometries and attributes of a specific spatial location in a natural resource or reserve, from disparate expert technical databases of such technical systems and applications without a common, spatial reference;
amalgamating and integrating the technical data, including computer developed or generated data, into the spatially-referenced database to track the changes in the logical status or physical state of the resource or reserve over time at such granular, spatially indexed level in relation to that location; and
translating the amalgamated, integrated and spatially-referenced, technical data, synthesizing technical and financial controls, regulatory codes and generally accepted best practices by means of a set of business rules to ensure optimal exploitation of an asset, into attributes of inventory or stock within a resource inventory or stock within a resource inventory;
wherein
the spatially-referenced database is usable by a commercially available inventory management system or application and the translated technical data constitutes inventory and stock items and transactions manageable within the inventory management system or application, that track over time the change in the logical status or physical state of the resource or reserve at such granular, spatially indexed level in relation to that location, and
the spatially-referenced database and the translated technical data retain the spatially indexed, technical geometries and attributes at such spatial location, enabling:
the integration and amalgamation of such data into a single spatially-indexed data structure encapsulating all the spatial, design, descriptive and quantification attributes related to the source data, providing a multi-collective, multi-disciplinary technical perspective of a given spatial location in the resource or reserve, and
interoperability between the technical systems and applications, by allowing extraction and reconstitution of such integrated amalgamated spatial and attribute data from the spatially-referenced database into the file format and structure required by the technical systems and applications and the inventory management system.

2. The method as claimed in claim 1 characterized in that the natural resources and reserves are depletable mineral resources and reserves, the extraction, amalgamation, integration, and translation are conducted continually by means of the computer-executable instructions, and the disparate, technical data is from disparate expert mining technical systems and applications, thereby providing for integrated mineral asset management in a mineral resource inventory.

3. The method as claimed in claim 2 wherein the non-transitory computer readable storage medium storing computer-executable instructions is configured to define the common spatial index with a specific level of granulation and spatial location and the common, integrated, spatially-referenced database is provided with an inter-operable framework that enables extraction of the amalgamated, integrated and spatially-referenced, data by the disparate expert technical systems and applications;

thereby making the resultant amalgamated, integrated and spatially-referenced, continually updated database available for the disparate expert technical systems and applications, for the inventory management application and for multi-disciplinary visualization and analysis, accounting for the impact of mining technical activity resulting in change in the logical status or physical state of the related resources and reserves, at a granular, spatially indexed level and in relation to a specific spatial location.

4. The method as claimed in claim 3 wherein the transactions are selected from a group of inventory-orientated transactions comprising:

accrual, mimicking procure or acquire transactions;
depletion, mimicking inventory or stock issue transactions;
shrinkage, mimicking theft or removal processing;
ullage, mimicking write-off of stock due to damage; and
movement, mimicking relocation of stock.

5. The method as claimed in claim 2 including the step of analyzing at least some of the technical descriptions, annotations, features and properties data being configured within the mineral resource inventory system for analytical and descriptive purposes, based on the requirements of the customer organization.

6. The method as claimed in claim 2, characterized in:

receiving, amalgamating and integrating disparate technical dimension and fact data defining spatial, design, descriptive or quantification geometries and attributes of a geospatial element in a natural resource or reserve,
wherein the received technical data is disparate without a common spatial index for enabling integration of the geometries and attributes to reasonably describe the collective technical perspective of the resource or reserve in relation to a specific spatial location to allow at least semi-continual tracking over time of changes in the logical status or physical state of the resource or reserve at that location;

defining a common spatial index with a specific level of granulation and geospatial orientation for the received, amalgamated and integrated data to enable such description of the resource or reserve and to allow such tracking in relation to that location;

maintaining the received, amalgamated and integrated data in an integrated database with reference to the common spatial index at least semi-continually to track the changes in the logical status or physical state of the resource or reserve over time at such granular, spatially indexed level; and translating the maintained data, based on predetermined criteria for the synthesis of the technical and financial controls and the regulatory codes and generally accepted best practices, to form data for an inventory related to the natural resource or reserve,
wherein the translated data is compatible with a predetermined inventory management application and constitutes inventory and stock items and transactions manageable within the inventory management application that track over time the change in the logical status or physical state of the resource or reserve at such granular, spatially indexed level; and
wherein the translated data retains the spatially indexed, technical geometries and attributes of the geospatial element.

7. The method as claimed in claim 1, characterized in:

receiving, amalgamating and integrating disparate technical dimension and fact data defining spatial, design, descriptive or quantification geometries and attributes of a geospatial element in a natural resource or reserve,
wherein the received technical data is disparate without a common spatial index for enabling integration of the geometries and attributes to reasonably describe the collective technical perspective of the resource or reserve in relation to a specific spatial location to allow at least semi-continual tracking over time of changes in the logical status or physical state of the resource or reserve at that location;

defining a common spatial index with a specific level of granulation and geospatial orientation for the received, amalgamated and integrated data to enable such description of the resource or reserve and to allow such tracking in relation to that location;

maintaining the received, amalgamated and integrated data in an integrated database with reference to the common spatial index at least semi-continually to track the changes in the logical status or physical state of the resource or reserve over time at such granular, spatially indexed level; and translating the maintained data, based on predetermined criteria for the synthesis of the technical and financial controls and the regulatory codes and generally accepted best practices, to form data for an inventory related to the natural resource or reserve,
wherein the translated data is compatible with a predetermined inventory management application and constitutes inventory and stock items and transactions manageable within the inventory management application that track over time the change in the logical status or physical state of the resource or reserve at such granular, spatially indexed level; and
wherein the translated data retains the spatially indexed, technical geometries and attributes of the geospatial element.

\* \* \* \* \*